United States Patent [19]
Walter

[11] Patent Number: 5,152,821
[45] Date of Patent: Oct. 6, 1992

[54] ADDITION OF SUPPLEMENTAL MACRO & MICRO NUTRIENTS TO GRANULAR PHOSPHATIC FERTILIZERS

[75] Inventor: Karl H. Walter, North Adelaide, Australia

[73] Assignee: Hi-Fert Pty. Ltd., North Adelaide, Australia

[21] Appl. No.: 303,566

[22] Filed: Jan. 27, 1989

[30] Foreign Application Priority Data

Feb. 1, 1988 [AU] Australia .................. PI6517

[51] Int. Cl.⁵ .............. C05B 7/00; C05B 19/00; C05G 1/06
[52] U.S. Cl. ........................... 71/33; 71/36; 71/64.02; 71/64.05; 71/64.06; 71/64.07
[58] Field of Search ............ 71/64.02, 64.05, 64.06, 71/64.07, 33, 34, 36

[56] References Cited

U.S. PATENT DOCUMENTS

| | | | |
|---|---|---|---|
| 3,607,214 | 9/1971 | Seiffe | 71/64.07 |
| 4,032,319 | 6/1977 | Smith et al. | 71/64.07 |
| 4,142,885 | 3/1979 | Heumann et al. | 71/28 |

FOREIGN PATENT DOCUMENTS 0190287 10/1984 Japan .................. 71/64.13

OTHER PUBLICATIONS

Ludwig, "How & Why Solids Agglomerate", 1954, Chemical Engr., pp. 156-159.

Primary Examiner—Ferris Lander
Attorney, Agent, or Firm—Klauber & Jackson

[57] ABSTRACT

A granular fertilizer is prepared by coating particles of a base fertilizer, selected from orthophosphates of calcium, ammonium and potassium and mixtures thereof, with:
(a) a first layer comprising 1 to 5% (by weight of the total composition) of water or an aqueous solution of a salt selected from the group of sulphates and phosphates of ammonium or potassium and mixtures thereof; and
(b) a second layer comprising (i) elemental sulphur and/or (ii) a supplemental micronutrient, and, if the first layer consists of water only, (iii) 0.1 to 10% (by weight of the total composition) of a salt selected from the group consisting of water-soluble sulphates and phosphates of ammonium or potassium, sulphates of metallic trace elements, and mixtures thereof.

7 Claims, No Drawings

ADDITION OF SUPPLEMENTAL MACRO & MICRO NUTRIENTS TO GRANULAR PHOSPHATIC FERTILIZERS

This invention relates to a method of coating phosphate containing fertilizer granules for the incorporation of sulphur and micronutrients.

Green plants require between sixteen and seventeen chemical elements, the "biogenic elements", for their nutrition. About 14 of these "biogenic elements" are taken up from the soil and are often referred to as "mineral nutrients". Some of these nutrients, the "macronutrients" (C, H, N, O, P, S, K, Ca, Mg), are required in relatively large quantities, while others, the "micronutrients" (Fe, Mn, Cu, Zn, Mo, B, Cl), are only needed in small amounts. The terms macro and micronutrients do not relate to the importance of the element in the mineral nutrition of plants, but solely to the quantity in which they are required.

Materials which supply mineral nutrients to plants are called fertilizers. These fertilizers are either used to increase the fertility status of poorer soils by increasing their mineral nutrient content to a more fertile level, or to maintain the fertility status of fertile soils by replenishing those mineral nutrients, which were removed in crops, wool, meat or by such natural processes as leaching or erosion.

On a purely arbitrary basis we distinguish again between macro and micronutrient fertilizers.

From a commercial point of view, the most important fertilizers are those supplying either phosphorus, nitrogen or potassium to the soil. In the past, especially the phosphatic fertilizers contained very large quantities of sulphur, which sufficed to meet the need of the plants. The development of more concentrated phosphatic fertilizers, which contain either small quantities of sulphur or none at all, as well as the considerable reduction of the atmospheric sulphur content as a result of air pollution abatement, has considerably reduced the amount of sulphur available to the plants. This reduction of sulphur will affect both the quality, as well as the quantity, of plant growth.

Since healthy growth can only occur if there is a balanced supply of all essential nutrients, it is necessary that fertilizers meet the requirements of the plants in regard to macro as well as micronutrients.

In comparison to the macronutrients, the quantity of micronutrients required is relatively small. For this reason it is ideal if the micronutrient can be incorporated into the macronutrient fertilizer. In the past micronutrients as well as sulphur were incorporated into fertilizers by the dry blending of the micronutrient-carrying compound with the macronutrient fertilizer. Since most macronutrient fertilizers were in a non-granular form, this dry blending operation yielded a relatively homogeneous non-segregating fertilizer.

The demands for better fertilizer quality in regard to such properties as dustiness, flowability, setting characteristics, etc. led about 30 years or so ago to the production of fertilizer in a granular form.

While closely sized granular fertilizers possess excellent physical properties in comparison with finely divided powdery fertilising materials, they cannot be dry blended with any material which does not match its particle sizing without causing serious problems in regard to particle segregation.

The problem of segregation has, in the past, been resolved by incorporating sulphur and micronutrients during the manufacture of the phosphatic fertilizer. Since these mixtures of phosphatic fertilizers with sulphur or micronutrients have to be stored separately, this method of incorporation is rather expensive from a storage space point of view.

For economic reasons, there is a continuing trend to manufacture such highly concentrated fertilizers as triple superphosphate (T.S.P.), double superphosphate (D.S.P.), monoammonium phosphates (M.A.P.) and diammonium phosphates (D.A.P.) in close vicinity to the phosphate mine and transport these materials over very long distances right around the world to the point of use. Since the requirements for macronutrients as well as micronutrients vary greatly with the type of soil, climate, as well as type of agriculture, the incorporation of sulphur and micronutrients at the time of manufacture is not a practical proposition.

While the coating of particles and tablets has been practised by the pharmaceutical industry for many years, the fertilizer industry employed coating mainly for the purpose of reducing dustiness during handling and caking during storage.

In 1964, T. P. HIGNETT, Director of Chemical Development at the Tennessee Valley Authority suggested [(1964), Comm. Fert., 108(1):23] that it was possible to incorporate micronutrients into granular fertilizers by adding 1 to 3% of oil, wax or other binders to stick the fine micronutrient materials onto the surface of the granules. While oil and waxes can be used to stick micronutrients onto the surfaces of fertilizers, the aliphatic and hydrophobic nature of these compounds prevents them from establishing a tenacious coat on the surface of the granule.

O. D. PHILEN et al teach in U.S. Pat. Nos. 3423199, U.S. Pat. No. 3520 651 and U.S. Pat. No. 3523 019 the coating of ammonium nitrate and show that zinc, iron and manganese can be tightly bonded onto the surface of hygroscopic fertilizer salts by spraying of a 70% aqueous ammonium nitrate solution onto a cascading bed of 87.5% granular ammonium nitrate, 10% zinc oxide and 2.5% kieselguhr, which is another name for diatomaceous earth. The resulting product consisted of ammonium nitrate coated with $Zn_5NH_4(NO_3)_2(OH)_9.3H_2O$ and $3\ Zn(OH)_2.NH_4NO_3$ which held the unreacted portion of the unreacted zinc oxide in a tightly bonded coating.

In another example O. D. PHILEN et al teach that granular triple superphosphate (T.S.P.) can be coated with 13% of a mixture of powdered oxides of iron, manganese and zinc by spraying the mixture of T.S.P. with 2.8% of an aqueous ammonium-polyphosphate solution. It is claimed that the zinc oxide forms in situ stable compounds such as $Zn_3(NH_4)_2(P_2O_7)_2.2H_2O$, which hold the unreacted portion of the oxides in the coating.

While ammonium nitrate solutions can be applied to granular ammonium nitrate, they cannot be employed on triple superphosphate. This is due to the fact that the ammonium nitrate will interact with mono-calcium orthophosphate forming highly hygroscopic calcium nitrate according to:

$$2NH_4NO_3 + Ca(H_2PO_4)_2.1H_2O \rightarrow Ca(NO_3)_2 + 2NH_4H_2PO_4 + H_2O$$

As far as the spraying of granules with ammoniumpolyphosphate solutions is concerned, J. J. MORTVEDT et al [Soil Sci. Amer. Prov. (1970), 34(2), 330-334; ibidem (1975), 39(4), 782-787] demonstrated that manganese as well as zinc will be less effective as a source of Mn and Zn in the presence of polyphosphates, which is due to the lower plant availability of the rather complex ammonium polyphosphates of zinc and manganese. This precludes the use of this coating method for fertilizers which should be applied on severely trace element deficient soils.

As far as the application of sulphur onto the surface of granular fertilizers is concerned, J. T. DILDAY discloses in U.S. Pat. No. 3 580 715 a method which produces tenacious coatings of sulphur, micronutrients or pesticides by applying 0.5 to 5% mineral oil until the granules are uniformly coated. Then 0.1% to 5% calcium lignosulphonate is applied as an aqueous solution, followed by the application of the powdered supplement. The sulphur to be added was finer than 45 microns or passed a 325 mesh A.S.T.M. screen.

While this method can be used for the incorporation of micronutrients, pesticides and sulphur to finished fertilizer granules, it requires that the supplemental materials are in a fine state of division to achieve a cohesive coating. As far as sulphur is concerned, its high degree of fineness means that it will be immediately oxidised and most likely lost by leaching. This is due to the fact that sulphate ions are very mobile in soils and are only slightly absorbed by clay minerals. If this method is employed for the incorporation of elemental sulphur to T.S.P., D.A.P., M.A.P. or Urea, the resulting sulphur fortified granules do not possess any slow release characteristics and are not very effective as a source of sulphur for pastures.

J. W. CHURCH teaches in U.S. Pat. No. 3 867 124 the coating, by dry mixing, of prilled ammonium nitrate and potassium nitrate with the adducts formed during the reaction between urea and such water-soluble compounds as $FeSO_4.7H_2O$, $MgSO_4.7H_2O$ and $CuSO_4.5H_2O$. While the urea adducts form a tenacious coating around nitrate prill, this method cannot be employed for the incorporation of elemental sulphur.

P. S. FLEMING U.S. Pat. No. 3 576 613 and G. M. BLOUIN U.S. Pat. No. 3 877 415 as well as U.S. Pat. No. 3 991 225 and W. R. ALI U.S. Pat. No. 4 081 264 use a spray of molten sulphur to produce a coating on fertilizer granules. The sulphur solidifies on the surface of the granules forming a semipermeable coating. These coatings are applied for the purpose of reducing the leaching losses of the more soluble fertilizers (urea, etc.) and to provide a more permanent source of fertilizer nutrient. The coating applied to the granules is too dense to be agronomically effective.

J. L. SMITH et al disclose in U.S. Pat. No. 4 032 319 the spraying of molten sulphur containing modifier onto a bed of granules in either a suitable coating apparatus or a fluidised bed. The modifier is a material which is more water-soluble than the molten coating material, such as swellable clay or the same material as the core. An inert atmosphere is applied in the coating zone to prevent fires and dust explosions. The finished fertilizer granule contains between 10% to 40% S. While these fertilizer granules are excellent sources of sulphur, the employment of an inert gas atmosphere as well as molten sulphur makes this method rather expensive from a capital as well as operating point of view.

In a previous Australian Patent No. 554 749, K. H. WALTER showed that it was possible to incorporate micronutrients by treating the phosphate-containing fertilizer with a mineral acid while the said granular fertilizer material is tumbled in the presence of a particulate micronutrient material, which is bonded to the surfaces of the fertilizer granules while said surfaces are wetted by the said acid. In addition, it is disclosed that the micronutrients can be either copper, cobalt, manganese, zinc or mixtures thereof in either the form of an oxide, sulphate, basic sulphate or mixtures thereof.

While this process allows the incorporation of every micronutrient, it cannot be used for the incorporation of elemental sulphur. This is due to the fact that elemental sulphur reduces sulphuric acid to sulphurous acid according to:

$$2H_2SO_4 + S \rightarrow 2H_2SO_3 + SO_2$$

which in turn decomposes into $SO_2$ and $H_2O$ according to:

$$H_2SO_3 \rightarrow H_2O + SO_2$$

Since sulphur dioxide has not only a pungent smell but also is rather toxic, special air pollution control equipment would have to be installed. Other setbacks of this method are that it cannot be used on triple superphosphate and double superphosphate without causing a serious problem of air pollution by the liberation of such highly pungent and toxic gases as $SiF_4$ and $H_2F_2$. Also the handling of the rather corrosive sulphuric acid requires a certain amount of know-how.

It is the object of the present invention to provide a method for the coating of such finished phosphate containing base fertilizers as Triple Superphosphate (T.S.P.), Double Superphosphate (D.S.P.), Single Superphosphate (S.S.P.), Diammonium phosphate (D.A.P.) and Mono-ammonium phosphate (M.A.P.) with such supplemental nutrients as Sulphur (S), Copper (Cu), Zinc (Zn), Manganese (Mn), Cobalt (Co), Molybdenum (Mo), Iron (Fe), etc., which overcomes the difficulties encountered with prior methods, and processes for the coating of granules.

According to this invention, there is a method provided for the production of less hygroscopic and more balanced granular materials (in relation to their nutrients) from a base fertilizer, selected from the group consisting of orthophosphates of calcium, ammonium and potassium and a mixture thereof, by the addition of supplementary nutrients.

This method comprises coating particles of the base fertilizer with:
 (a) a first layer comprising 1 to 5% (by weight of the total composition) of water or an aqueous solution of a salt selected from the group of sulphates and phosphates of ammonium or potassium and mixtures thereof; and
 (b) a second layer comprising (i) elemental sulphur and/or (ii) a supplemental micronutrient, and, if the first layer consists of water only, (iii) 0.1 to 10% (by weight of the total composition) of a salt selected from the group consisting of water-soluble sulphates and phosphates of ammonium or potassium, sulphates of metallic trace elements, and mixtures thereof.

This may be achieved, for example, by establishing a thin tacky film on the surface of the granules by placing at least one said base fertilizer in a mixing cum granulating cum coating device and spraying said fertilizer granules with either 1 to 5% (by weight of the total composition) of water or an aqueous solution of a salt, selected from the group of sulphates and phosphates of ammonium or potassium and mixtures thereof, to effect a uniform thin tacky film on the surfaces of the granules, and thereafter adding to the tumbling bed of wet and sticky granules in the mixing cum granulating cum coating device the desired quantity of any of the supplemental nutrients or mixtures thereof and, if water only was employed for the formation of the tacky film, between 0.1 and 10% (by weight of the total composition) of a salt selected from the group consisting of water-soluble sulphates and phosphates of ammonium or potassium, sulphates of metallic trace elements, and mixtures thereof. The coating operation is finished off by continuing to subject the granules to the rather complex strong mechanical forces encountered during tumbling in a cascading bed of particulates.

The state of hydration of the reaction products is generally considerably greater than that of the base fertilizer or of the ingredients used in the establishment of the coating. Any water used during manufacture is absorbed as water of hydration.

In one form, the invention provides a method of coating, which is based upon the interaction of some of the chemical constituents in the top layer of the granules with the chemicals employed in the establishment of the coating, and some of the supplemental nutrients to be incorporated into the coating, thereby ensuring that this said coating is an intimate part of the original granule.

The compounds formed during the said interactions normally have a higher state of hydration than those in the original granule, thereby ensuring that the water employed in the establishment of the sticky and tacky film is removed as water of hydration, thereby ensuring that no heat has to be employed for the drying of the wet granules.

The major constituents of the base fertilizers will normally be:

MONOCALCIUM PHOSPHATE = $Ca(H_2PO_4)_2 \cdot 1-H_2O$
WATER = $H_2O$
PHOSPHORIC ACID = $H_3PO_4$
MONOAMMONIUM PHOSPHATE = $NH_4H_2PO_4$
DIAMMONIUM PHOSPHATE = $(NH_4)_2HPO_4$ The predominant reactions between the major constituents in the various base fertilizers and the chemicals employed for the establishment of a coating may be written as follows:
(Me = Cu, Zn, Mn, Co or Fe)
Me $SO_4 \cdot n$ Me$(OH)_2$ = Basic sulphates
n = 1 to 9
PHOSPHORIC ACID: (Mainly in T.S.P., D.S.P. and S.S.P.)

$$2 H_3PO_4 + K_2SO_4 \rightarrow 2 KN_2PO_4 + H_2SO_4 \quad (1A)$$

$$2 H_3PO_4 + (NH_4)_2 SO_4 \rightarrow 2 NH_4H_2PO_4 + H_2SO_4 \quad (1B)$$

$$2 H_3PO_4 + MeSO_4 \rightarrow Me(H_2PO_4)_2 + H_2SO_4 \quad (2)$$

$$2 H_3PO_4 + MeO + nH_2O \rightarrow Me(H_2PO_4)_2 \cdot (n+1)H_2O \quad (3)$$

$$H_3PO_4 + MeO + nH_2O \rightarrow MeHPO_4 \cdot (n+1)H_2O \quad (4)$$

$$3 H_3PO_4 + MeO + nH_2O \rightarrow Me[H_7(PO_4)_3] \cdot (n+1)H_2O \quad (5)$$

$$2 H_3PO_4 + 3MeO + nH_2O \rightarrow Me_3(PO_4)_2 \cdot (N+3)H_2O \quad (6)$$

MONOCALCIUM PHOSPHATE:

$$Ca(H_2PO_4)_2 \cdot 1H_2O + (NH_4)_2SO_4 + H_2O \rightarrow 2NH_4H_2PO_4 + CaSO_4 \cdot 2H_2O \quad (7A)$$

$$Ca(H_2PO_4)_2 \cdot 1H_2O + K_2SO_4 + H_2O = 2 KN_2PO_4 + CaSO_4 \cdot 2H_2O \quad (7B)$$

$$Ca(H_2PO_4)_2 \cdot 1H_2O + MeSO_4 + H_2O \rightarrow Me(H_2PO_4)_2 + CaSO_4 \cdot 2H_2O \quad (8)$$

$$Ca(H_2PO_4)_2 \cdot 1H_2O + MeO + nH_2O \rightarrow Ca[MeH_2(PO_4)_2] \cdot (n+2) H_2O \quad (9A)$$

$$Ca(H_2PO_4)_2 \cdot 1H_2O + MeO + nH_2O \rightarrow CaHPO_4 \cdot 2H_2O + MeHPO_4 \cdot (nH_2O) \quad (9B)$$

$$2Ca(H_2PO_4)_2 \cdot 1H_2O + NH_4H_2PO_4 + H_2O \rightarrow Ca_2[NH_4H_7(PO_4)_4] \cdot 2H_2O + H_3PO_4 \quad (10)$$

$$Ca(H_2PO_4)_2 \cdot 1H_2O + (NH_4)_2HPO_4 \rightarrow Ca(NH_4)_2(HPO_4)_2 \cdot 1H_2O + H_3PO_4 \quad (11)$$

MONOAMMONIUM PHOSPHATE:

$$2 NH_4H_2PO_4 + MeSO_4 + nH_2O \rightarrow Me(H_2PO_4)_2 \cdot nH_2O + (NH_4)_2SO_4 \quad (12)$$

$$2 NH_4H_2PO_4 + MeO + nH_2O \rightarrow Me(H_2PO_4)_2 \cdot (n+1)H_2O + 2NH_3 \quad (13)$$

$$NH_4H_2PO_4 + MeO + nH_2O \rightarrow MeNH_4PO_4 \cdot (n+1)H_2O \quad (14)$$

$$2 NH_4H_2PO_4 + 3 MeO + nH_2O \rightarrow Me_3(PO_4)_2 \cdot (n+3)H_2O + 2NH_3 \quad (15)$$

DI-AMMONIUM PHOSPHATE:

$$(NH_4)_2 HPO_4 + MeSO_4 + nH_2O \rightarrow Me HPO_4 \cdot nH_2O + (NH_4)_2SO_4 \quad (16)$$

$$(NH_2)_2 HPO_4 + MeO + nH_2O \rightarrow Me HPO_4 \cdot (n+1)H_2O + 2NH_3 \quad (17)$$

$$2(NH_2)_2 HPO_4 + 3MeO + nH_2O \rightarrow Me_3(PO_4)_2 \cdot (n+3)H_2O + 4NH_3 \quad (18)$$

$$(NH_4)_2 HPO_4 + MeO + nH_2O \rightarrow Me NH_4PO_b \cdot (n+1)H_2O + NH_3 \quad (19)$$

In addition to these reactions between the constituents of the base fertilizer and the coat-producing chemicals, some of the reaction products formed during these interactions will react further according to:
From reactions 1A, 1B and 2

$$H_2SO_4 + Ca(H_2PO_4)_2 \cdot 1H_2O \rightarrow CaSO_4 \cdot 1H_2O 2H_3PO_4 \quad (20)$$

$$H_2SO_4 + (NH_4)_2 HPO_4 \rightarrow H_3PO_4 + (NH_4)_2SO_4 \quad (21)$$

$$H_2SO_4 + 2NH_4H_2PO_4 \rightarrow 2H_3PO_4 + (NH_4)_2SO_4 \quad (22)$$

$$H_2SO_4 + MeO + nH_2O \rightarrow MeSO_4 \cdot (n+1) H_2O \quad (23)$$

$$H_2SO_4 + a MeO + nH_2O \rightarrow MeSO_4 \cdot )a-1) MeO \cdot (N+1)H_2O \quad (24)$$

From reactions 13, 15, 17, 18 and 19

$$NH_3 + H_3PO_4 \rightarrow NH_4 H_2PO_4 \quad (25)$$

$$2NH_3 + H_2SO_4 \rightarrow (NH_4)_2 SO_4 \quad (26)$$

$$NH_3 + NH_4 H_2PO_4 \rightarrow (NH_4)_2 HPO_4 \quad (27)$$

$$2NH_3 + CaSO_4 + nH_2O \rightarrow (NH_4)_2SO_4 + Ca(OH)_2) + (n-2)H_2O \quad (28)$$

These rather multiple reactions, which are occurring during the coating operation, always form, as far as the phosphates are concerned, compounds having much lower solubilities as well as a higher state of hydration than the original compound.

Since many reactions take place between solids, this means that the surface area of the reactants plays a major role. While the surface area of the base fertilizer cannot be changed without destroying completely the granules, we can ensure that the supplemental nutrients have a large surface area by subjecting said supplemental nutrients to processes of comminution.

As far as sulphur is concerned, the state of division is decided by agronomic and not by chemical considerations. It has long been recognised that elemental sulphur is agronomically most effective if it has the following size distribution:

| AGRONOMICALLY MOST EFFECTIVE SIZE DISTRIBUTION FOR ELEMENTAL SULPHUR. | |
|---|---|
| PARTICLE DIAM: $\mu m$ | PERCENT BELOW |
| 250 | 100 |
| 200 | 99 |
| 180 | 84 |
| 150 | 55 |
| 75 | 97 |

All other supplemental nutrients should be at least as fine as the elemental sulphur.

The supplemental micronutrient may be any agriculturally acceptable compound(s) of copper, magnesium, zinc, manganese, cobalt, iron, boron, molybdenum or a mixture thereof. For example, the supplemental micronutrient may comprise or include copper oxide, copper sulphate, basic copper sulphate, zinc oxide, zinc sulphate, basic zinc sulphate, manganous oxide, manganous sulphate, cobalt sulphate, basic cobalt sulphate, ammonium molybdate, magnesium oxide, ferrous sulphate or a mixture thereof.

Sulphates of metallic trace elements are, in particular, sulphates of manganese, zinc, copper or cobalt.

In addition our work has shown that the underlying principles for this coating process are the same as those for agglomerative granulation. This coating process has been designed in such a manner that one or more of the chemical compounds in the granules to be coated, and the supplementary nutrients to be affixed to the granules, will react with each other. Since this reaction occurs between ions in solution, the dry granules of the base fertilizer have to be wetted first before they come into contact with the water-soluble constituents in the solids to be incorporated into the coat.

During the wetting process, the water will ingress into the surface of the granules, dissolving some of the water-soluble constituents in the granules. Since this wetting is occurring in a tumbling bed, the surface of the granules will become tacky and shiny. At this stage of the process, the dry coating material will be added.

Due to the tacky as well as plastic nature of the surface of the granules, the particles to be coated onto the surface of the granules will be picked up by this tacky film and incorporated. Since the coating materials will always contain a compound which will react with some of the water-soluble constituents of the tacky film, slightly more water has to be added to finish off the reaction. The success of this type of coating process depends entirely upon:

a) the type of reaction product formed during the coating operation, b) the uniform wetting of the granules as well as a uniform ingression of the coating liquid into the granules, c) the application of the appropriate quantity of coating liquid (overwetting leads to the formation of raspberry type agglomerates, while underwetting means that some of the additives cannot be incorporated into the coat), d) the particle size distribution of the additives (coarse particles can cause problems as far as a smooth surface is concerned), e) the degree of agitation or mechanically forced contact within the tumbling bed of granules to be coated, f) the time of coating, g) the depth of the coating bed, h) the surface characteristics of the solids (hydrophilic, hydrophobic, surface-texture, etc.), i) the surface tension of the coating liquid, j) the physico-chemical properties of the additives, as well as the granules to be coated, k) the coating temperature.

In order to achieve a very tenaciously adhering coat, in which the crystallites formed during the chemical reactions of the coating process will interlock with each other, the granules to be coated have to be subjected to the maximum possible amount of mechanical forces in the bed of tumbling solids. Furthermore we were able to demonstrate that, for the same time of coating, a deeper bed of granules will establish more tenaciously adhering coats than shallow beds.

In order to achieve maximum densification of the coat, the granules to be coated should have a minimum residence time of two minutes in a rotary coating drum, which should have a bed occupying between 20 and 35% of the total drum volume and rotate between 20 and 80% of the critical speed, whereby the critical speed $N_{cs}$ is defined as the speed at which the centrifugal force on a particle in the rotating coating device equals, in the zenith of rotation, the gravitational forces on the said particles. That is achieved when $g = r w^2$, g being the acceleration due to gravity (9.81 m sec.$^{-2}$), 2r being the diameter of the cylindrical coating device in meters and w the angular velocity in radians per sec. The critical speed is then given by:

$$N_{cs} = \frac{42.317}{\sqrt{2r}} \text{ r.p.m.}$$

In order to provide a better understanding of this coating process, this invention will be described with the aid of a pilot-sized coating drum having the following dimensions:

DIAMETER OF COATING DRUM = 1.0 m
LENGTH OF COATING DRUM = 1.0 m

BED OF GRANULES AS % OF DRUM = 2-5%–35%

SPEED OF ROTATION = 16.92 r.p.m. or 40% of critical speed

OUTPUT PER HOUR = 0.5–2.5 tonnes

COATING TIME = 2 to 10 minutes

In order to achieve a smooth and tenaciously adhering coat, it is desirable that the water of coating is added to the bed of tumbling granules in a split addition.

The first addition of coating water, which amounts to about 50 to 90% of the total water to be added, is introduced as closely as possible to the feed point of the fertilizer granules. The remainder of the coating water is added shortly after the addition of the supplementary nutrients.

The sprays employed for the addition of the coating liquid should be sufficiently fine to ensure a proper distribution of this liquid over the surface of the tumbling bed, but not so fine that spray drift will occur and cause problems of wetting of the inside walls of the coating device.

Last but not least it should be mentioned that the amount of coating liquid required for the establishment of a tenaciously adhering coat can be reduced by increasing the residence time of the granules in the coating device.

In the following Examples, all percentages are on a weight basis.

EXAMPLE I

In this series of tests, granules of triple superphosphate were coated with elemental sulphur and ammonium sulphate, which were mixed together before grinding them to the desired degree of fineness.

The following table shows the ingredients, which were employed in these coating tests.

| TEST | COMPOSITION OF MIX % | | | | COATING TIME | ANALYSES OF COATED GRANULES | |
|---|---|---|---|---|---|---|---|
| No. | T.S.P. | S | $(NH_4)_2SO_4$ | $H_2O$ | (min.) | $P_t$ % | $S_t$ % |
| 1.1 | 94.35 | 3.5 | 0.35 | 1.9 | 9 | 19.52 | 5.01 |
| 1.2 | 91.66 | 5.76 | 0.58 | 2.2 | 8 | 19.00 | 7.27 |
| 1.3 | 88.07 | 8.30 | 0.83 | 2.8 | 6 | 18.23 | 9.64 |
| 1.4 | 85.30 | 11.0 | 1.1 | 2.6 | 2 | 17.66 | 12.55 |
| 1.5 | 82.1 | 13.4 | 1.3 | 3.2 | 10 | 17.0 | 14.95 |
| 1.6 | 78.6 | 16.0 | 2.0 | 3.4 | 10 | 16.28 | 17.70 |
| 1.7 | 75.1 | 19.0 | 2.4 | 3.5 | 10 | 15.5 | 20.73 |

$P_t$ % = total phosphorus content (as a percentage)
$S_t$ % = total sulphur content (as a percentage)

Similar results were obtained if ammonium sulphate was replaced on a stoichiometric basis by $K_2SO_4$, MAP or DAP.

On a weight basis, the following weights had to be employed to replace 100 g of $(NH_4)_2SO_4$:

$K_2SO_4 = 131.86$ g/100 g $(NH_4)_2 SO_4$

MAP = 174.12 g/100 g $(NH_4)_2 SO_4$

DAP = 99.99 g/100 g $(NH_4)_2 SO_4$

EXAMPLE II

In this series of tests, the appropriate quantity of ammonium sulphate was dissolved in the water of coating.

The following tests were performed at a coating time of 10 minutes.

| TEST | CONC. of SPRAY SOLUTION | COMPOSITION OF MIX % | | | | ANALYSES OF COATED GRANULES | |
|---|---|---|---|---|---|---|---|
| No. | % w/w $(NH_4)_2SO_4$ | T.S.P. | S | $(NH_4)_2SO_4$ | $H_2O$ | $P_t$ % | $S_t$ % |
| 2.1 | 15 | 93.81 | 3.6 | 0.39 | 2.2 | 19.41 | 5.1 |
| 2.2 | 25 | 87.73 | 8.4 | 0.97 | 2.9 | 18.16 | 9.96 |
| 2.3 | 30 | 81.19 | 14.1 | 1.41 | 3.3 | 16.81 | 15.66 |
| 2.4 | 40 | 76.0 | 18.0 | 2.4 | 3.6 | 15.73 | 19.72 |

$P_t$ % = total phosphorus content (as a percentage)
$S_t$ % = total sulphur content (as a percentage)

While the granules produced were excellent, this method suffers from the following disadvantages:

a) It is difficult to dissolve the ammonium sulphate in the appropriate quantity of water.

b) Any undissolved $(NH_4)_2SO_4$, as well as water-insoluble contaminants in the $(NH_4)_2SO_4$, will lead to blockages in the spray nozzle, which means the solution would have to be filtered before it could be sprayed.

c) Ammonium sulphate solutions are corrosive to mild steel, meaning that special precautions have to be taken in regard to material of construction for the dissolution section.

d) Since the concentration of ammonium sulphate solution has to be varied with sulphur addition, the density of the solution will be different for different final sulphur contents. This fact complicates the volumetric control of the spray solution addition.

EXAMPLE III

In test series No. 3, the partial as well as complete replacement of sulphur by such insoluble trace element carriers as ZnO, CuO and MnO was tested. The trace element carriers were added to the sulphur before grinding. The following table shows the ingredients employed in these series of tests.

| TEST | COMPOSITION OF MIX % | | | | | ANALYSES OF GRANULES | | |
|---|---|---|---|---|---|---|---|---|
| No. | T.S.P. | S | MeO | $(NH_4)_2SO_4$ | $H_2O$ | $P_t$ % | $S_t$ % | |
| 3.1 | 85.3 | 9.72 | 1.28 (Cu) | 1.1 | 2.6 | 17.64 | 11.28 | 1.0% Cu |
| 3.2 | 85.3 | 9.72 | 1.28 (Zn) | 1.1 | 2.6 | 17.65 | 11.28 | 1.0% Zn |
| 3.3 | 85.7 | 7.8 | 3.20 (Zn) | 1.1 | 2.6 | 17.67 | 9.35 | 2.5% Zn |
| 3.4 | 85.7 | NIL | 11.0 (Mn) | 1.1 | 2.7 | 17.68 | 1.55 | 6.8% Mn |

$P_t$ % = total phosphorus content (as a percentage)
$S_t$ % = total sulphur content (as a percentage)

The metal content of the metal oxides (Me O) used in these tests was as follows:
Zn O = 78% as Zn
Cu O = 78% as Cu
Mn O = 62% as Mn

EXAMPLE IV

The purpose of this series of tests was to establish the possibility of replacing water soluble sulphates of ammonia or potassium by either $MnSO_4.1H_2O$, $ZnSO_4.1H_2O$ or $CuSO_4.1H_2O$, on MAP granules. The trace element carriers were finely ground before they were added to the bed of tacky granules.

| TEST | COMPOSITION OF MIX % | | | | ANALYSES | | |
|---|---|---|---|---|---|---|---|
| No. | % MAP | % Me O | % Me $SO_4$ $1H_2O$ | % $H_2O$ | $P_t$ % | $N_t$ % | % |
| 4.1 | 96.8 | NIL | 0.70 Zn | 2.5 | 21.3 | 9.7 | 0.25 as Zn |
| 4.2 | 95.7 | NIL | 1.41 Zn | 2.9 | 21.1 | 9.6 | 0.50 as Zn |
| 4.3 | 91.4 | NIL | 5.63 Zn | 3.0 | 20.1 | 9.1 | 1.0 as Zn |
| 4.4 | 93.4 | 1.76 Zn | 1.76 Zn | 3.1 | 20.5 | 9.3 | 2.0 as Zn |
| 4.5 | 90.0 | 3.52 Zn | 3.52 Zn | 3.0 | 19.8 | 9.0 | 4.0 as Zn |
| 4.6 | 82.7 | 7.04 Zn | 7.04 Zn | 3.2 | 18.2 | 8.3 | 8.0 as Zn |
| 4.7 | 94.2 | NIL | 2.86 Cu | 2.9 | 20.72 | 9.42 | 1.0 as Cu |
| 4.8 | 93.8 | 2.10 Cu | 1.05 Cu | 3.1 | 20.63 | 9.38 | 2.0 as Cu |
| 4.9 | 90.5 | 4.20 Cu | 2.10 Cu | 3.2 | 19.90 | 9.05 | 4.0 as Cu |
| 4.10 | 94.3 | NIL | 3.22 Mn | 2.5 | 20.75 | 9.43 | 1.0 as Mn |
| 4.11 | 92.3 | 2.32 Mn | 2.32 Mn | 3.1 | 20.31 | 9.23 | 2.0 as Mn |
| 4.12 | 87.3 | 4.64 Mn | 4.64 Mn | 3.4 | 19.21 | 8.73 | 4.0 as Mn |

$P_t$ % = total phosphorus content (as a percentage)
$N_t$ % = total nitrogen content (as a percentage)

The metal content of the oxides and sulphates employed in these tests were as follows:

| ZnO = 78% as Zn; | $ZnSO_4.1H_2O$ = 35.5 |
|---|---|
| CuO = 78% as Cu; | $CuSO_4.1H_2O$ = 35.0 |
| MnO = 62% as Mn; | $MnSO_4.1H_2O$ = 31.0 |

Similar results were obtained when granules of T.S.P. or D.A.P. instead of MAP were used in these coating tests.

Furthermore it was found that cobalt sulphate, ammonium molybdate, magnesium oxide and ferrous sulphate monohydrate could be added without interfering with the stability of the coat.

Finally it is to be understood that various alterations and/or additions may be introduced into the formulations and arrangements of the present invention without departing from the spirit or ambit of the invention.

I claim:

1. A process for producing a granular fertilizer, wherein particles of a base fertilizer, selected from the group consisting of orthophosphates of calcium, ammonium and potassium and mixtures thereof, are coated with:
    (a) a first layer comprising 1 to 5% (by weight of the total composition), said first layer being selected from the group of aqueous solutions consisting of water, ammonium sulfates, potassium sulfates, ammonium phosphates, potassium phosphates and mixtures thereof; and
    (b) a second layer comprising (i) sulfur in which all particles have a diameter less than 0.250 mm and at least 55% of these particles have a diameter less than 0.150 mm and, if the first layer consists of water only (ii) 0.1 to 10% (by weight of the total composition) of a salt selected from the group consisting of water-soluble ammonium sulfates, water-soluble potassium sulfates, water-soluble ammonium phosphates, water-soluble potassium phosphates, water-soluble sulfates of metallic trace elements, and mixtures thereof.

2. A process according to claim 1, wherein the base fertilizer is selected from the group consisting of triple superphosphate, double superphosphate, single superphosphate, monoammonium phosphate and diammonium phosphate.

3. A granular fertilizer produced by the process of claim 1.

4. A process for producing a coated granular fertilizer, wherein granules of a granular base fertilizer, selected from the group consisting of orthophosphates of calcium, ammonium and potassium and mixtures thereof, are coated by placing at least one such granular base fertilizer in a mixing-cum-coating device and by spraying the granules within said device with either water or an aqueous solution of a salt to thereby establish;
    (a) a first layer comprising 1 to 5% (by weight of the total composition), said first layer being selected from the group of aqueous solutions consisting of water, ammonium sulfates, potassium sulfates, ammonium phosphates, potassium phosphates and mixtures thereof;

thereafter adding to the tumbling bed of wet and sticky granules within said device the desired quantity of powdered elemental sulfur in which all particles have a diameter less than 0.250 mm and at least 55% of these particles have a diameter less than 0.150 mm, to thereby establish:

(b) a second layer comprising (i) said powdered elemental sulfur and, if the first layer consists of water only, (ii) 0.1 to 10% (by weight of the total composition) of a salt selected from the group consisting of water-soluble ammonium sulfates, water-soluble ammonium phosphates, water soluble potassium phosphates sulfates, water-soluble sulfates of metallic trace elements, and mixtures thereof; and thereafter finishing off the coating operation by subjecting the coated granules to the mechanical forces encountered in said mixing-cum-coating device, thereby allowing an interaction between some of the chemical constituents on the exterior of the base granules with some of the chemical constitutes employed in the establishment of the coating, thereby enhancing the adherence of the coating to the base granules.

5. A process according to claim 4, wherein the base fertilizer is selected from the group consisting of triple superphosphate, double superphosphate, single superphosphate, monoammonium phosphate and diammonium phosphate.

6. A granular fertilizer produced by the process of claim 4.

7. A process according to any one of claims 1, 2, 4 or 5 wherein the second layer consists of a mixture of powdered elemental sulfur in which all particles have a diameter less than 0.250 mm and at least 55% of these particles have a diameter less than 0.150 mm with 0.1 to 10% (by weight of the total composition) of a salt selected from the group consisting of water-soluble ammonium sulfates, water soluble potassium sulfates, water-soluble ammonium phosphates, water-soluble potassium phosphates, water-soluble sulfates of metallic trace elements, and mixtures thereof.

* * * * *